(12) United States Patent
Brown et al.

(10) Patent No.: US 9,344,449 B2
(45) Date of Patent: May 17, 2016

(54) RISK RANKING REFERENTIAL LINKS IN ELECTRONIC MESSAGES

(71) Applicant: Bank of America Corporation, Charlotte, NC (US)

(72) Inventors: Robert Justin Brown, Santa Monica, CA (US); Craig A. Froelich, Thousand Oaks, CA (US)

(73) Assignee: Bank of America Corporation, Charlotte, NC (US)

( * ) Notice: Subject to any disclaimer, the term of this patent is extended or adjusted under 35 U.S.C. 154(b) by 178 days.

(21) Appl. No.: 13/793,492

(22) Filed: Mar. 11, 2013

(65) Prior Publication Data

US 2014/0259158 A1 Sep. 11, 2014

(51) Int. Cl.
  G08B 23/00 (2006.01)
  H04L 29/06 (2006.01)
  G06F 21/55 (2013.01)
  H04L 12/58 (2006.01)

(52) U.S. Cl.
  CPC .......... *H04L 63/1483* (2013.01); *G06F 21/554* (2013.01); *H04L 51/063* (2013.01); *H04L 51/08* (2013.01); *G06F 2221/2119* (2013.01)

(58) Field of Classification Search
  CPC ........... H04L 63/1438; H04L 63/1433; G06Q 10/0635; G06F 2221/2119
  See application file for complete search history.

(56) References Cited

U.S. PATENT DOCUMENTS

| | | | |
|---|---|---|---|
| 7,516,488 B1 * | 4/2009 | Kienzle | ............... H04L 12/585 726/22 |
| 7,590,698 B1 | 9/2009 | Cooley | |
| 7,634,810 B2 | 12/2009 | Goodman et al. | |
| 7,668,921 B2 | 2/2010 | Proux et al. | |
| 7,802,298 B1 | 9/2010 | Hong et al. | |
| 7,831,611 B2 | 11/2010 | Roberts et al. | |
| 7,841,003 B1 | 11/2010 | Emdee | |
| 7,854,001 B1 | 12/2010 | Chen et al. | |
| 7,925,883 B2 | 4/2011 | Florencio et al. | |
| 7,945,684 B2 * | 5/2011 | Bates | ................. G06Q 10/107 709/225 |
| 7,975,297 B2 | 7/2011 | Xavier et al. | |
| 8,019,995 B2 | 9/2011 | van Bemmel | |
| 8,032,594 B2 | 10/2011 | Helsper et al. | |
| 8,122,251 B2 | 2/2012 | Santos et al. | |

(Continued)

OTHER PUBLICATIONS

"What is SiteAdvisor software?", retrieved online [http://www.siteadvisor.com/howitworks/index.html] on Feb. 8, 2013, pp. 1-5, McAfee.

*Primary Examiner* — Fatoumata Traore
*Assistant Examiner* — Khoi Le
(74) *Attorney, Agent, or Firm* — Banner & Witcoff, Ltd.; Michael A. Springs

(57) ABSTRACT

A computer system enables a business to reduce risks from phishing electronic messages. One or more original web links embedded in the electronic message may be replaced with a replacement web link. If the determined risk score for the original webpage is large enough webpage and the user clicks on the embedded web link, a user is directed to an intermediate webpage rather than to the original webpage. The intermediate webpage may provide details about the original webpage so that the user can make an informed choice whether to proceed to the original website. For example, the intermediate webpage may provide pertinent information to a user such as the actual domain of the remote site, the country the site is hosted in, how long the site has been online, and a rendered screen capture of the remote website, and/or a confidence score.

22 Claims, 11 Drawing Sheets

(56) References Cited

U.S. PATENT DOCUMENTS

| | | | |
|---|---|---|---|
| 8,141,150 B1 | 3/2012 | Krishnamurthy | |
| 8,171,559 B2 | 5/2012 | Hamilton, II et al. | |
| 8,189,924 B2 | 5/2012 | Iofis | |
| 8,220,047 B1 | 7/2012 | Soghoian et al. | |
| 8,245,304 B1 | 8/2012 | Chen et al. | |
| 8,281,394 B2 | 10/2012 | Ford et al. | |
| 8,291,065 B2 | 10/2012 | Goodman et al. | |
| 8,300,791 B2 | 10/2012 | O'Sullivan et al. | |
| 8,307,431 B2* | 11/2012 | Krishnamurthy | G06F 21/552 726/22 |
| 8,321,934 B1 | 11/2012 | Cooley et al. | |
| 8,447,643 B2* | 5/2013 | Barnes, Jr. | G06F 3/04847 705/14.19 |
| 8,825,759 B1* | 9/2014 | Jackson | H04L 67/02 705/14.69 |
| 8,839,401 B2* | 9/2014 | Starink | H04L 63/0281 726/11 |
| 8,881,289 B2* | 11/2014 | Basavapatna | G06F 21/552 726/25 |
| 9,009,334 B1* | 4/2015 | Jenkins | G06F 21/55 709/203 |
| 2005/0086161 A1 | 4/2005 | Gallant | |
| 2006/0015722 A1* | 1/2006 | Rowan | H04L 63/0823 713/166 |
| 2006/0080735 A1 | 4/2006 | Brinson et al. | |
| 2006/0095955 A1 | 5/2006 | Vong | |
| 2006/0101120 A1 | 5/2006 | Helsper et al. | |
| 2006/0123464 A1* | 6/2006 | Goodman | H04L 63/1416 726/2 |
| 2006/0123478 A1* | 6/2006 | Rehfuss | H04L 63/1408 726/22 |
| 2006/0168066 A1* | 7/2006 | Helsper | G06Q 10/107 709/206 |
| 2006/0224511 A1 | 10/2006 | Allemann | |
| 2007/0005984 A1 | 1/2007 | Florencio et al. | |
| 2007/0033639 A1 | 2/2007 | Goodman | |
| 2007/0039038 A1 | 2/2007 | Goodman et al. | |
| 2007/0044149 A1 | 2/2007 | Xavier et al. | |
| 2007/0094500 A1 | 4/2007 | Shannon et al. | |
| 2007/0094727 A1 | 4/2007 | Singh | |
| 2007/0112814 A1* | 5/2007 | Cheshire | G06F 17/30876 |
| 2007/0118528 A1* | 5/2007 | Choi | H04L 12/585 |
| 2007/0136806 A1* | 6/2007 | Berman | G06Q 10/107 726/22 |
| 2007/0192855 A1 | 8/2007 | Hulten et al. | |
| 2007/0199054 A1 | 8/2007 | Florencio et al. | |
| 2007/0233643 A1 | 10/2007 | Kang et al. | |
| 2007/0245422 A1 | 10/2007 | Hwang et al. | |
| 2007/0283000 A1 | 12/2007 | Proux et al. | |
| 2008/0034428 A1 | 2/2008 | Bejar et al. | |
| 2008/0046738 A1 | 2/2008 | Galloway et al. | |
| 2008/0104672 A1 | 5/2008 | Lunde et al. | |
| 2008/0115214 A1 | 5/2008 | Rowley | |
| 2008/0141342 A1 | 6/2008 | Curnyn | |
| 2008/0163369 A1* | 7/2008 | Chang | G06F 21/51 726/22 |
| 2008/0244715 A1 | 10/2008 | Pedone | |
| 2008/0276315 A1 | 11/2008 | Shuster | |
| 2009/0006532 A1 | 1/2009 | Sinn et al. | |
| 2009/0006861 A1 | 1/2009 | Bemmel | |
| 2009/0055928 A1 | 2/2009 | Kang et al. | |
| 2009/0064325 A1 | 3/2009 | Ford et al. | |
| 2009/0064327 A1 | 3/2009 | Stukanov | |
| 2009/0077383 A1* | 3/2009 | de Monseignat | H04L 63/0823 713/175 |
| 2009/0077637 A1 | 3/2009 | Santos et al. | |
| 2009/0089287 A1 | 4/2009 | Roberts et al. | |
| 2009/0089859 A1 | 4/2009 | Cook et al. | |
| 2009/0116630 A1 | 5/2009 | O'Sullivan et al. | |
| 2009/0144308 A1 | 6/2009 | Huie et al. | |
| 2009/0172775 A1 | 7/2009 | Mardikar et al. | |
| 2009/0235360 A1 | 9/2009 | Hamilton, II et al. | |
| 2009/0300768 A1 | 12/2009 | Krishnamurthy et al. | |
| 2009/0328208 A1 | 12/2009 | Peters | |
| 2010/0042687 A1 | 2/2010 | Wang | |
| 2010/0043071 A1 | 2/2010 | Wang | |
| 2010/0092076 A1 | 4/2010 | Iofis | |
| 2010/0154055 A1 | 6/2010 | Hansen | |
| 2010/0186088 A1* | 7/2010 | Banerjee | G06F 21/51 726/23 |
| 2010/0235918 A1* | 9/2010 | Mizrahi | H04L 63/168 726/25 |
| 2010/0241865 A1 | 9/2010 | Chang et al. | |
| 2010/0251380 A1 | 9/2010 | Zhang et al. | |
| 2010/0306819 A1 | 12/2010 | Nahari et al. | |
| 2010/0306845 A1* | 12/2010 | Vaithilingam | G06Q 10/107 726/23 |
| 2010/0313266 A1 | 12/2010 | Feng et al. | |
| 2011/0055922 A1 | 3/2011 | Cohen et al. | |
| 2011/0083182 A1 | 4/2011 | Emdee | |
| 2011/0173273 A1 | 7/2011 | Krachtus et al. | |
| 2011/0247070 A1 | 10/2011 | Xavier et al. | |
| 2012/0174235 A1 | 7/2012 | Hamilton, II et al. | |
| 2012/0230582 A1 | 9/2012 | Iofis | |
| 2012/0240213 A1 | 9/2012 | Lin et al. | |
| 2012/0272330 A1 | 10/2012 | Soghoian et al. | |
| 2013/0031627 A1 | 1/2013 | Wang et al. | |
| 2013/0031628 A1 | 1/2013 | Wang et al. | |
| 2013/0031630 A1 | 1/2013 | Krishnamurthy et al. | |

* cited by examiner

RISK RANKING REFERENTIAL LINKS IN ELECTRONIC MESSAGES

FIELD

Aspects described herein relate to a computer system that supports referential links in electronic messages such as embedded web links in electronic mail (e-mail) messages.

BACKGROUND

Phishing, which is variant of the term fishing, is the act of attempting to acquire information such as usernames, passwords, and credit card details (and sometimes, indirectly, money) by masquerading as a trustworthy entity in an electronic communication. Communications purporting to be from businesses, popular social web sites, auction sites, online payment processors, or information technology (IT) administrators are commonly used to lure the unsuspecting public. Phishing e-mail messages may contain links to websites that are infected with malware. Phishing may occur by e-mail spoofing or instant messaging and often directs users to enter details at a fake website whose look and feel are almost identical to the legitimate one. Phishing is an example of social engineering techniques used to deceive users, and typically exploits the poor usability of web security technologies. Attempts to deal with the growing number of reported phishing incidents include legislation, user training, public awareness, and technical security measures. Thus, it is desirable that the risk of phishing be reduced or eliminated.

BRIEF SUMMARY

Aspects described herein address one or more of the issues mentioned above by disclosing methods, computer readable media, and apparatuses that enable a business, e.g., a financial institution to reduce risks from phishing electronic message. One or more original web links embedded in the electronic message may be replaced with replacement (alias) web links. If the determined degree of risk (which may be referred to as a risk score) is large enough for the original webpage, a user is directed to an intermediate webpage rather than the original webpage if the user clicks on the embedded web link. Consequently, a user can click on any embedded web link without hesitation. If the determined risk level is not deemed to be high, the user goes directly to the website. On the other hand, if the risk level is high, the user is taken to an intermediate site so that the user can make a conscious decision based on provided information.

With another aspect of the embodiments, the intermediate webpage (which may be referred to as a speed-bump page) provides details about the original webpage so that the user can make an informed choice whether to proceed to the original website. For example, a plurality of intermediate webpages may be maintained at a business's security server, where each intermediate webpage corresponds to a particular suspicious remote website having a corresponding web link that is embedded in electronic mail. The intermediate webpage may provide pertinent information to a user such as the actual domain of the remote site, the country the site is hosted in, how long the site has been online, a rendered screen capture of the remote website, and/or a confidence score that the site is valid or risky.

With another aspect of the embodiments, the intermediate webpage enables a user to make several choices about whether to proceed to the original webpage. After presenting information to the user about the webpage, the user may conclude that the remote site looks good and is what the user is looking for. On the other hand, the remote site may appear to be bad and may be an attempt to deceive the user.

With another aspect of the embodiments, user selections presented on the intermediate webpage are tracked by the business to determine a rating of the corresponding remote web site. For example, each time one of the users in a business clicks one of those buttons presented in an intermediate web page, the selection represents a vote for or against that remote site.

With another aspect of the embodiments, a risk score is determined for an original webpage (addressed by the original web link embedded in an electronic message before replacing it with a replacement web link). The risk score may be determined from e-mail headers, characteristics of e-mail, publicly obtainable information about remote web links, remote web servers, and/or derived information about historical data about previous e-mail messages.

Aspects of the embodiments may be provided in a computer-readable medium having computer-executable instructions to perform one or more of the process steps described herein.

These and other aspects of the embodiments are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
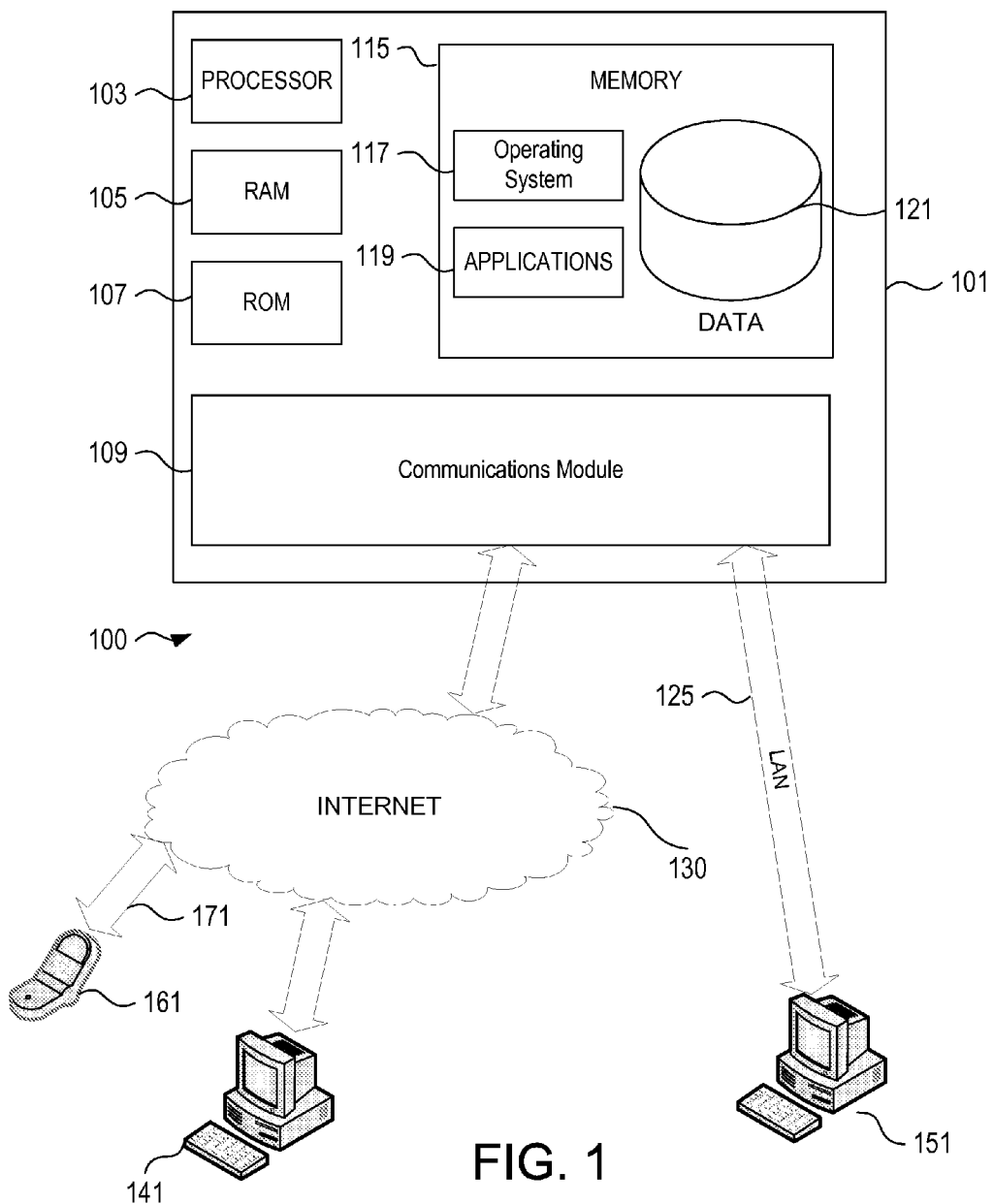
FIG. 1 shows an illustrative operating environment in which various aspects of the embodiments may be implemented.

In accordance with various aspects of the embodiments, methods, computer-readable media, and apparatuses are disclosed for reducing the risk of phishing electronic messages, e.g., electronic mail (e-mail), in which the recipient may have been otherwise tricked into clicking on a malicious web link in the message.

Many types of phishing use some form of technical deception designed to make a web link in an e-mail to appear to belong to the spoofed organization. Misspelled remote uniform resource locators (URLs) or the use of subdomains are common tricks used by phishers. For example, the hypothetical URL, http://www.name.example.com/, appears as though the URL will take a user to the example section of the name website; actually this URL points to the name (i.e. phishing) section of the example website. In other words, the phishing URL reverses the section designation with the name of the website. Another common trick is to make the displayed text for a link (the text between the <A> tags) suggest a reliable destination, when the link actually goes to the phisher's website. In the lower left hand corner of most browsers users can preview and verify where the link is going to take them. Hovering the cursor over the link for a couple of seconds may do a similar thing, but this may still be set by the phisher.

A further problem with URLs may be found in the handling of internationalized domain names (IDN) in web browsers that might allow visually identical web addresses to lead to different, possibly malicious, websites. Despite the publicity surrounding the flaw, also known as IDN spoofing or homograph attack, phishers have taken advantage of a similar risk, using open URL redirectors on the websites of trusted organizations to disguise malicious URLs with a trusted domain. Even digital certificates may not solve this problem because it is quite possible for a phisher to purchase a valid certificate and subsequently change content to spoof a genuine website.

Furthermore, phishers have used images instead of text to make it harder for anti-phishing filters to detect text commonly used in phishing e-mails.

If the user were tricked into clicking on a malicious web link, the malicious web link may take the user to a page that very closely resembles the look and feel of a legitimate web page, and then ask the user to input their credentials or other data. An example would be a link to a fake online banking website designed to trick the user into inputting the user's identification (ID), password, and security questions. The risk is the theft of credentials or exfiltration of bank data. In conjunction or alternatively, the link may take the user to a page that contains malicious software designed to exploit any vulnerabilities on the user's personal computer (PC).

To reduce these risks, traditional security systems may utilize different controls with varying degrees of success. Inbound email may be filtered to reject detected SPAM messages. Also, when a user (typically an employee of a business) clicks on web links, proxy servers in the business's internal network may provide a level of testing and validation of the link. Effectiveness may be limited to categorized and known-bad websites. Also, uncategorized web sites may present the user with a warning asking if they really need to visit the site. Traditional systems may provide one or more of the above controls as other controls; however, these controls typically have significant limitations. For example, laptops, mobile devices, and other endpoints may not be on the company's internal network and thus may bypass the proxy server check. This also includes bring-your-own-device (BYOD) devices that may communicate directly with the remote web servers without the benefit of an intermediary proxy. Moreover, the ability to navigate to remote websites by clicking on links may enable automatic delivery of "0 day" or unknown malware that exploits vulnerabilities in the browser, plugins, or operating system that are not widely known and cannot yet be patched.

With an aspect of the embodiments, a risk model considers various aspects of pertinent information to create a risk score for the webpage that is addressed by a web link (e.g., URL) in order to gauge the possibility that the webpage is malicious. Some or all of the original URLs that are contained in an email message may be replaced with an alias URLs, which may be a shortened form (referred as a shortened URL) of the original URL. However, with some embodiments, the alias URL (which may be referred as the replaced web link) may be of the same length or greater length than the original URL.

With an aspect of the embodiments, a designated computing device (e.g., a server) that is administered by a business entity replaces embedded web links in an electronic message with alias web links to ensure that access to webpages addressed by the embedded web links are not malicious. When a user clicks on a replaced web link in an electronic message, the risk score of the corresponding original web page is compared to a predetermined threshold. If the risk score is sufficiently large, an intermediate webpage (which may be referred as a speed-bump page) is presented to the user. The intermediate webpage provides details about the original webpage so that the user can make an informed choice whether to proceed to the original website.

Figure 2:
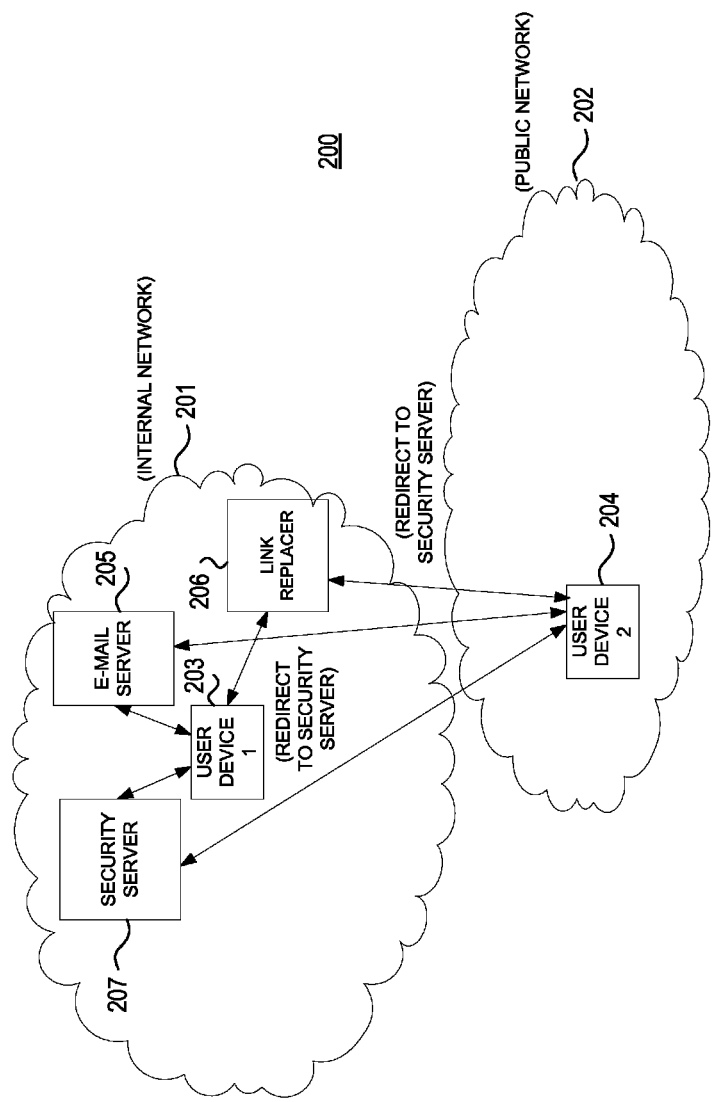
FIG. 2 shows a first system that processes and handles web links embedded in electronic messages in accordance with an aspect of the embodiments.
Figure 3:
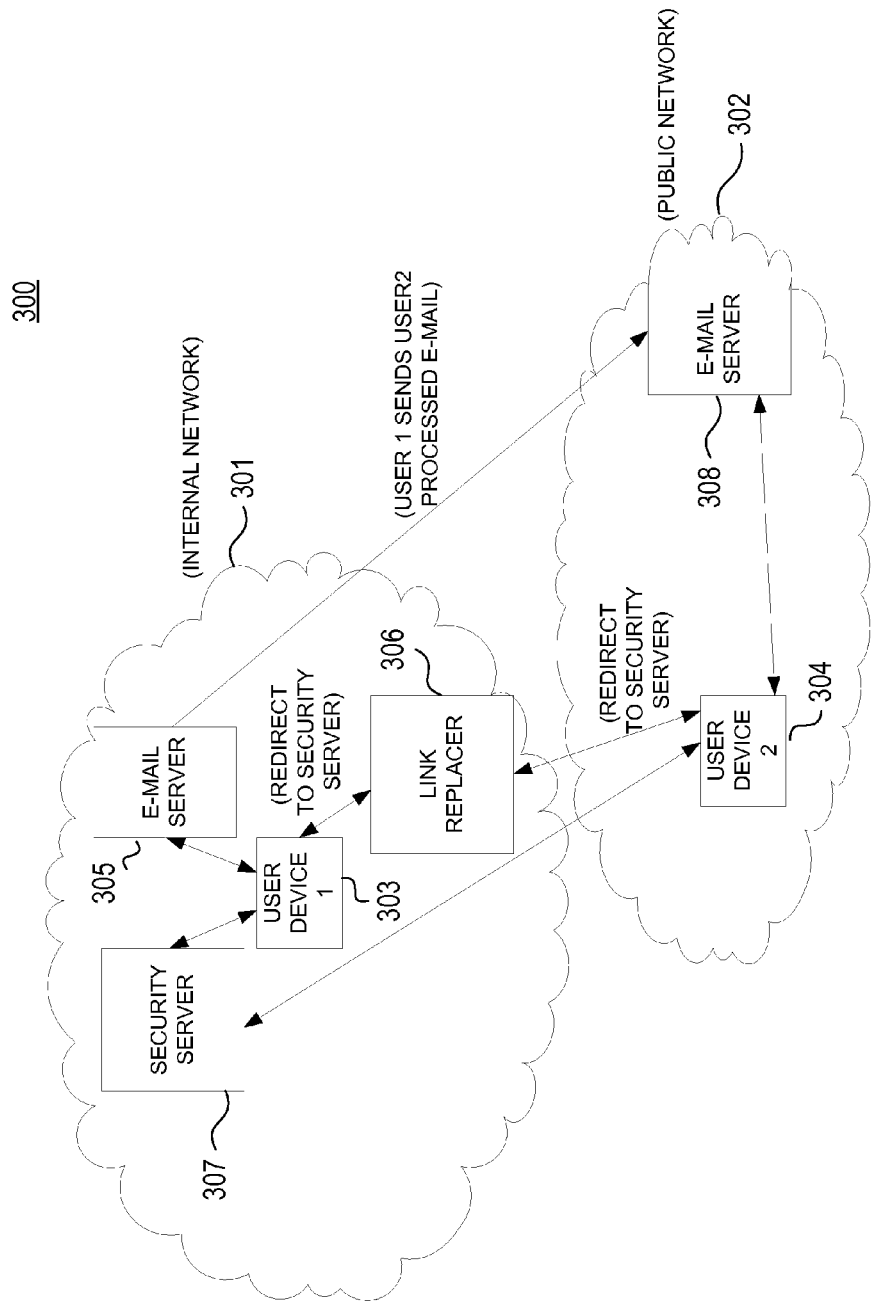
FIG. 3 shows another system that processes and handles web links embedded in electronic messages in accordance with an aspect of the embodiments.
Figure 9:
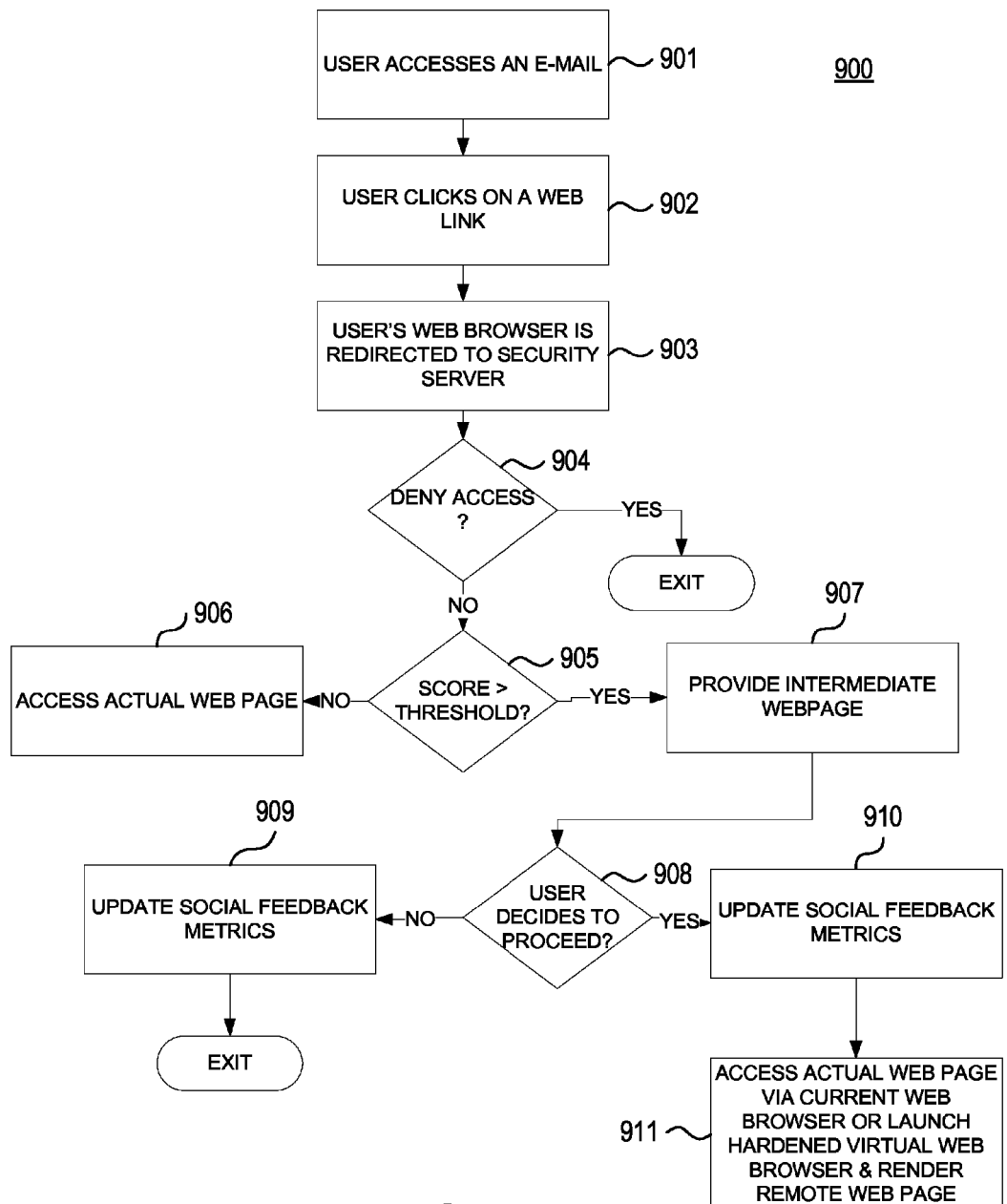
FIG. 9 shows a flow chart for processing an access request of a webpage that is addressed by an embedded web link in an electronic message in accordance with an aspect of the embodiments.
Figure 10:
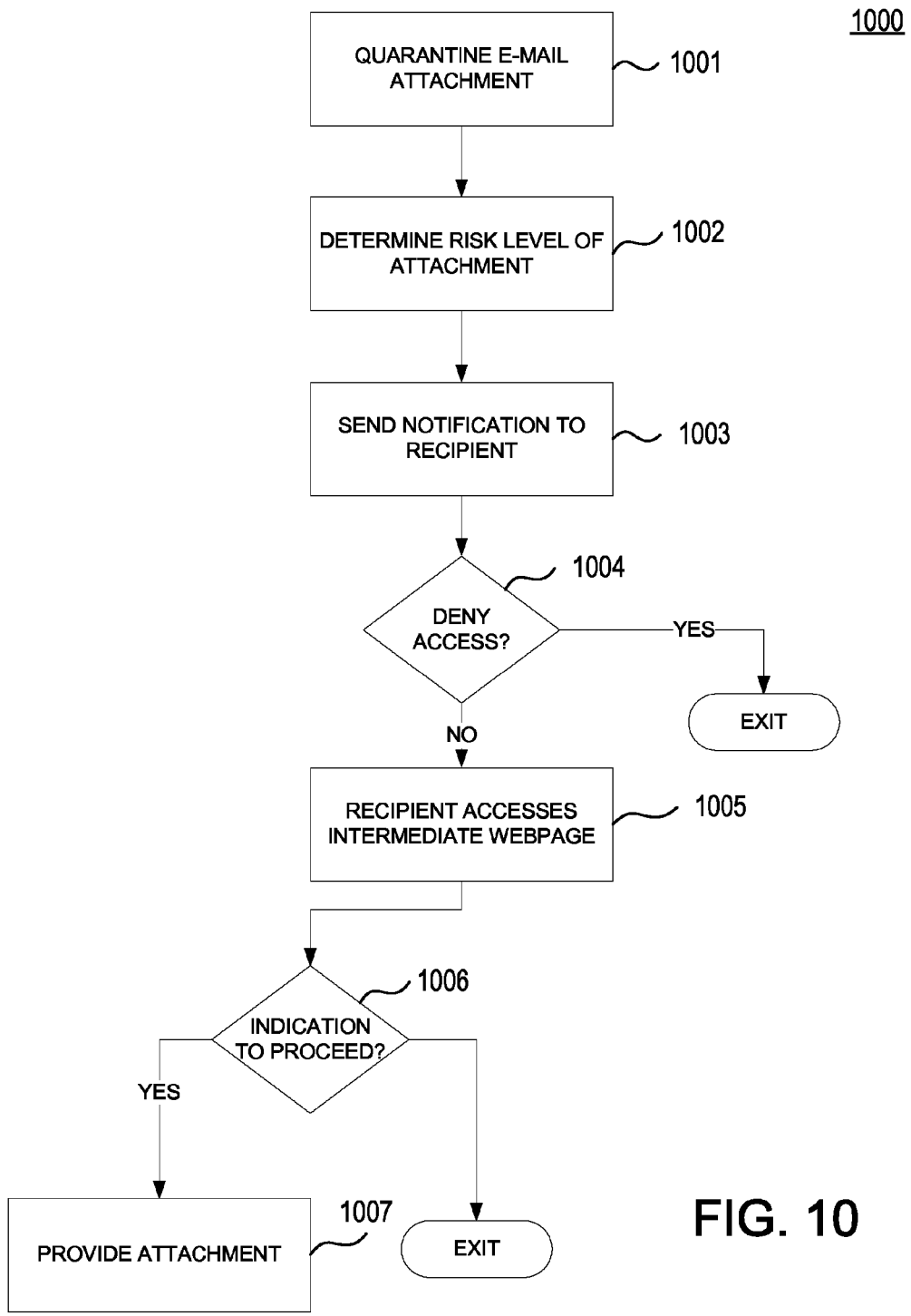
FIG. 10 shows a flow chart for processing an attachment in an electronic message in accordance with an aspect of the embodiments.
Figure 11:
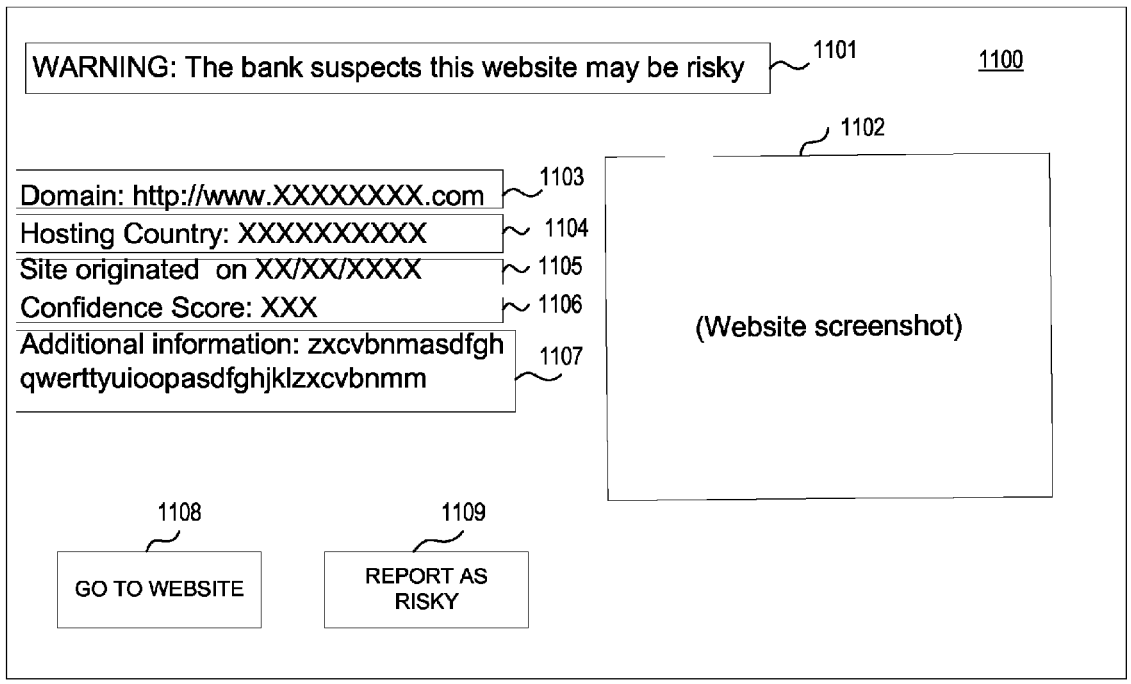
FIG. 11 shows an exemplary screenshot in which an intermediate webpage is displayed in accordance with an aspect of the embodiments.

FIG. 1 illustrates an example of a suitable computing system environment 100 that may be used according to one or more illustrative embodiments for implementing any of the computing devices in FIGS. 2 and 3, performing processes 600-1000 as shown in FIGS. 6-10, respectively, and/or displaying an exemplary intermediate webpage as shown in FIG. 11. The computing system environment 100 is only one example of a suitable computing environment and is not intended to suggest any limitation as to the scope of use or functionality of the invention. The computing system environment 100 should not be interpreted as having any dependency or requirement relating to any one or combination of components shown in the illustrative computing system environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence and receipts to digital files.

Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). Database 121, for example, may provide centralized storage of a mapping between alias URLs and actual URLs, that may be received from different points in system 100, e.g., computers 141 and 151 or from communication devices, e.g., communication device 161. Also, database 121 may contain parameters for determining a risk score of a webpage as will be further discussed.

Computing device 101 may operate in a networked environment supporting connections to one or more remote computing devices, such as computing device 151. Computing device 151 may be a personal computing device or server that may include many or all of the elements described above relative to the computing device 101.

Information such as URL mappings and/or risk score parameters may be accessed through Internet 130 using computing device such as personal computing device 141 or mobile device 161. Mobile device 161 may be a mobile device communicating over wireless carrier channel 171 through Internet 130.

The network connections depicted in FIG. 1 include a local area network (LAN) 125 and Internet 130, but may also include other networks. When used in a LAN networking environment, computing device 101 is connected to the LAN 125 through a network interface or adapter in the communications module 109. When used in a wide area network (WAN) networking environment, the server 101 may include a modem in the communications module 109 or other means for establishing communications, such as the Internet 130. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. The network connections may also provide connectivity to a CCTV or image/iris capturing device.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 101. Such a processor may execute computer-executable instructions stored on a computer-readable medium.

The steps that follow, in reference to FIGS. 6-10, may be implemented by one or more of the components in FIG. 1 and/or other components, including other computing devices.

FIG. 2 shows system 200 that processes and handles web links in electronic messages in accordance with an aspect of the embodiments. Phishing techniques may offer challenges specific electronic messaging. Perpetrators external to a business often utilize 'phishing' techniques targeting internal employees and contractors. The following content exemplifies an e-mail attempting to illicitly obtain account information about the persons' account with a financial institution:

> Someone with IP address xxx.xxx.xxx.xx tried to access your personal account! Please click the link below and enter your account information to confirm that you are not currently away. You have 3 days to confirm account information or your account will be locked.
> Click the link below to activate your account:

Phishing e-mails are typically designed to closely resemble legitimate messages and can be sent to one or many recipients. Consequently, an aspect of the embodiments is directed to risk reduction of phishing e-mails that are designed to trick the recipient into clicking on a web link in the message.

Moreover, as will be further discussed, a malicious e-mail may contain malicious attachments. A malicious web link that is sent to a user via e-mail may be hosted on the Internet and is typically designed to achieve at least one of the two objectives, First, the web link may take the user to a webpage that very closely resembles the look and feel of a legitimate webpage, and then ask the user to input their credentials or other data. An example would be a link to a fake online banking website designed to trick the user into inputting their user ID, password, and security questions. The risk is the theft of credentials or exfiltration of the business's data. Second, the link may take the user to a webpage that contains malicious software designed to exploit a vulnerability on the client PC. In this case, the user may or may not see a webpage and could simply dismiss the link as spam. Malicious software can be silently installed with no user interaction or notice.

Figure 6:
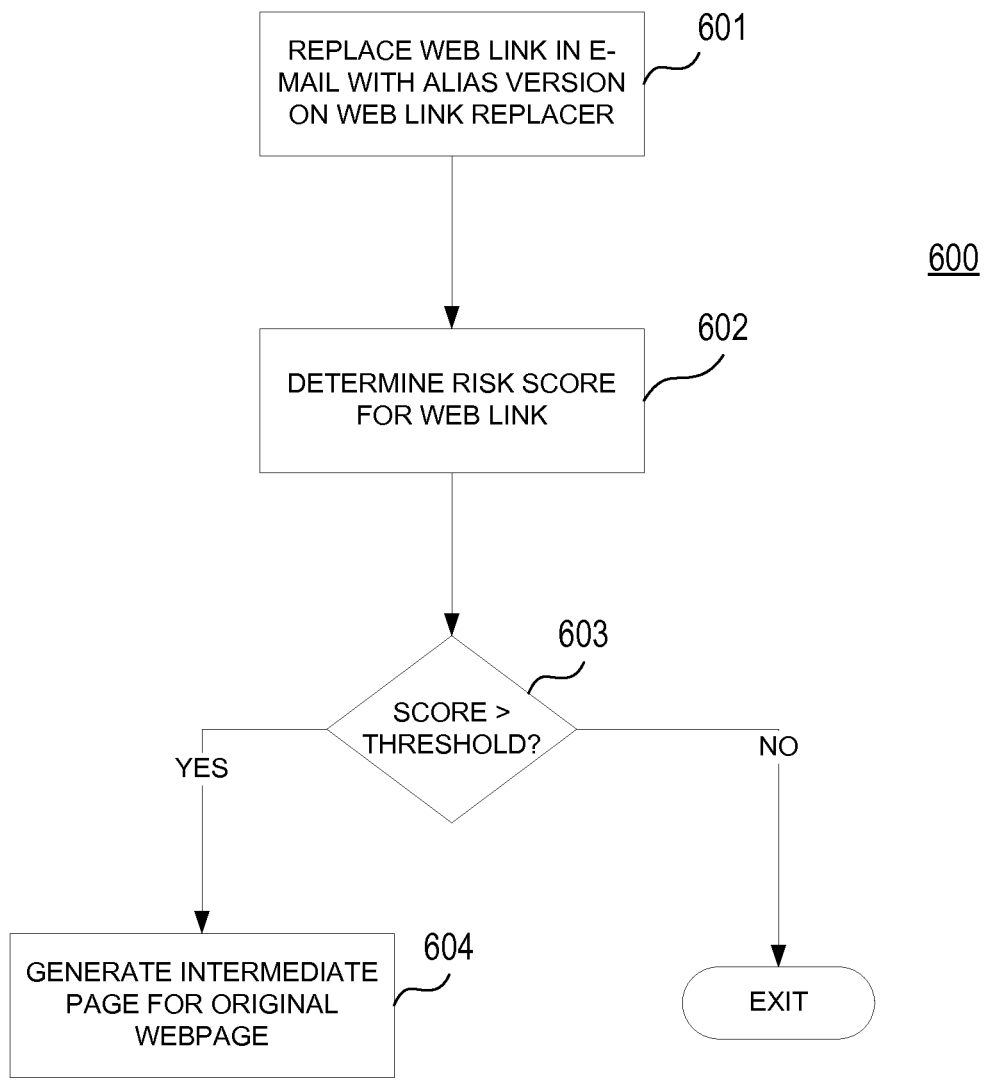
FIG. 6 shows a flow chart for processing an electronic message before a user can access it in accordance with an aspect of the embodiments.

Referring to FIG. 2, user devices 203 and 204 are operated by employees of a business having internal network 201. However, user device 204 is operating within a public network (Internet) 202, in which the user is accessing e-mail from the business's e-mail server 205. With some embodiments, user device 204 accesses corporate e-mail through a virtual private network (VPN) or accesses personal e-mail through other means. User devices 203 and 204 accesses e-mail from e-mail server 205. As will be discussed, in reference to flowchart 600 as shown in FIG. 6, e-mail is processed by e-mail server 205 before e-mail can be accessed. For example, embedded web links in e-mail are replaced with corresponding alias web links. With some embodiments, all embedded web links in e-mail are replaced in order to insure complete control of accessing remote webpages. However, embodiments may support a partial replacement, in which only web links that are suspicious web links or not trusted are replaced.

When a user clicks on a replaced web link, the user's web browser accesses link replacer 206, which may be implemented as one or more servers that reside within internal network 201. Link replacer 206 maps the replaced web link to the original web link so that the web browser is directed to the appropriate entry at security server 207 in order that proper security measures may be performed for the original webpage. For example, each original webpage that has been replaced in e-mail has a corresponding entry at security server 207. Consequently, before the user's web browser accesses the original webpage, security server may interact with the user to ensure security. In order to ensure security, as will be further discussed with FIGS. 6 and 8, security server 207 may determine a risk score for the remote web site and generate an intermediate webpage. Pertinent security information about the actual (original) webpage and/or e-mail may be presented to the user so that the user can make an informed decision whether to access the actual webpage and/or e-mail. However, if the risk score is less than the predetermined threshold, the web browser may directly access the actual webpage without further user interaction.

The replaced web link is an alias web link that may have a length smaller, greater, or the same as the length of the original web link that is embedded in the e-mail. For example, if the replaced web link has a length less than the original embedded web link, link replacer 206 may be referred as a link shortener.

As discussed above, security server 207 is configured in internal network 201 that may be controlled by a business. However, with some embodiments, security server 207 may be configured in public network 202. As an example, consider an actual web link such as xxxxxx.com./xxxxxxxxx/ xxxxxxxx/xxxxxxxxxx that is embedded in an electronic message. With some embodiments, link replacer 206 supports a web link replacement process in which an alias for the destination website is created, such as http://xxx.xx/xxxx. The replaced web link is created to point to security server 207 (e.g., with a URL of http://www.company.com).

With some embodiments, e-mail server 205 replaces the actual web link with the alias web link. When a user clicks on the replaced web link, the user's web browser is directed to link replacer 206. Because the alias web link is registered on link replacer 206, the replaced web link is valid. Consequently, the web browser is then directed to security server 207, enabling the business to provide security from potentially malicious remote web sites by, for example, executing process 900 as shown in FIG. 9. As will be further discussed, when the user clicks on the replaced web link (URL) that we inserted into the e-mail, the user's web browser may not always be taken to the original website. In the event that the risk score is high enough (for example as discussed in FIG. 7), the user is presented with an intermediate webpage (which may be referred as speed-bump page). This webpage typically provides important details to enable the user to make an informed choice as to whether or not to proceed to the website.

Figure 5:
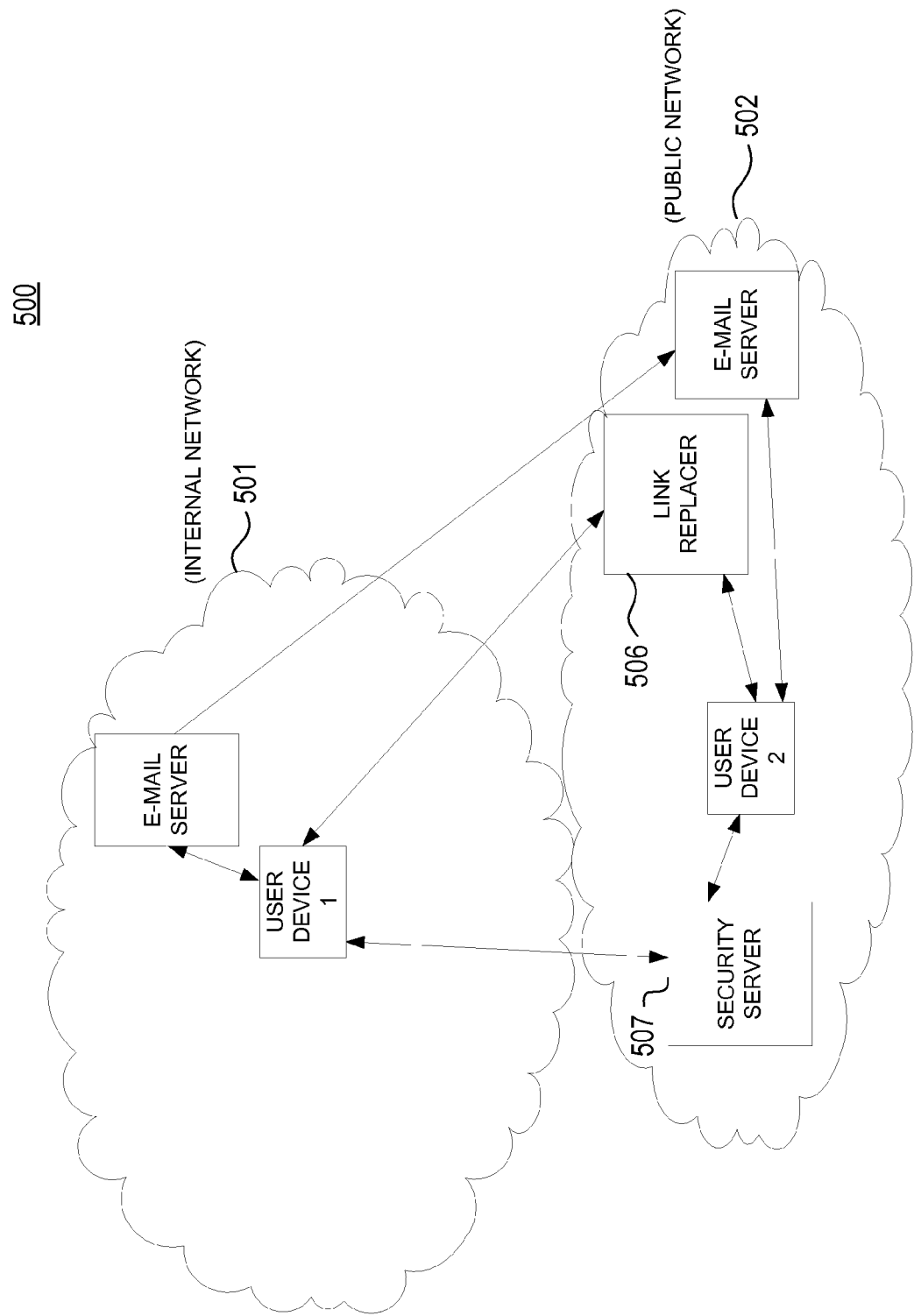
FIG. 5 shows another system that processes and handles web links embedded in electronic messages in accordance with an aspect of the embodiments.

Link replacer 206 may typically operate across both corporate and personal e-mail as long as user device 204 has the ability to interact with security server 207. As shown in FIG. 2, security server 207 and link replacer 206 are configured within internal network 201; however, with some embodiments a security server and/or link replacer may be configured within a public network as shown in FIG. 5.

System 200 may support a security model that takes into consideration various aspects of the information to create a risk score for a web link (e.g., remote URL) based on how likely it is to be malicious. System 200 also supports automatic replacement of all web links that are contained in an e-mail message with an alias web linked (replaced web link). While embodiments may shorten the web link, embodiments may replace the web link with a replacement web link having a length equal or greater length as the original web link.

FIG. 3 shows a system 300 that processes and handles web links in electronic messages in accordance with an aspect of the embodiments. The scenario depicted in FIG. 3 is similar to the scenario depicted in FIG. 2, where networks 301 and 302, user device 303, e-mail server 305, link replacer 306, and security server 307 correspond to networks 201 and 202, user device 203, e-mail server 205, link replacer 206, and security server 207, respectively. However, user device 304 accesses electronic messages from e-mail server 308, which resides in public network 302 rather than internal network 301. For example, user 303 may be an employee of the company having internal network 303, while user 304 is not. User 303 may forward processed e-mail (where one or more embedded web links are replaced) from e-mail server 305 to user 304 at e-mail server 308. Link replacer 306 and security server 307 are accessible by user device 304 from public network 302. For example, a VPN tunnel may be present for replaced URL links to be valid. When user 304 clicks on any replaced web link in a forwarded e-mail, the user's web browser is directed to security server 307, which executes a security process such as process 900 as shown in FIG. 9.

Figure 4:
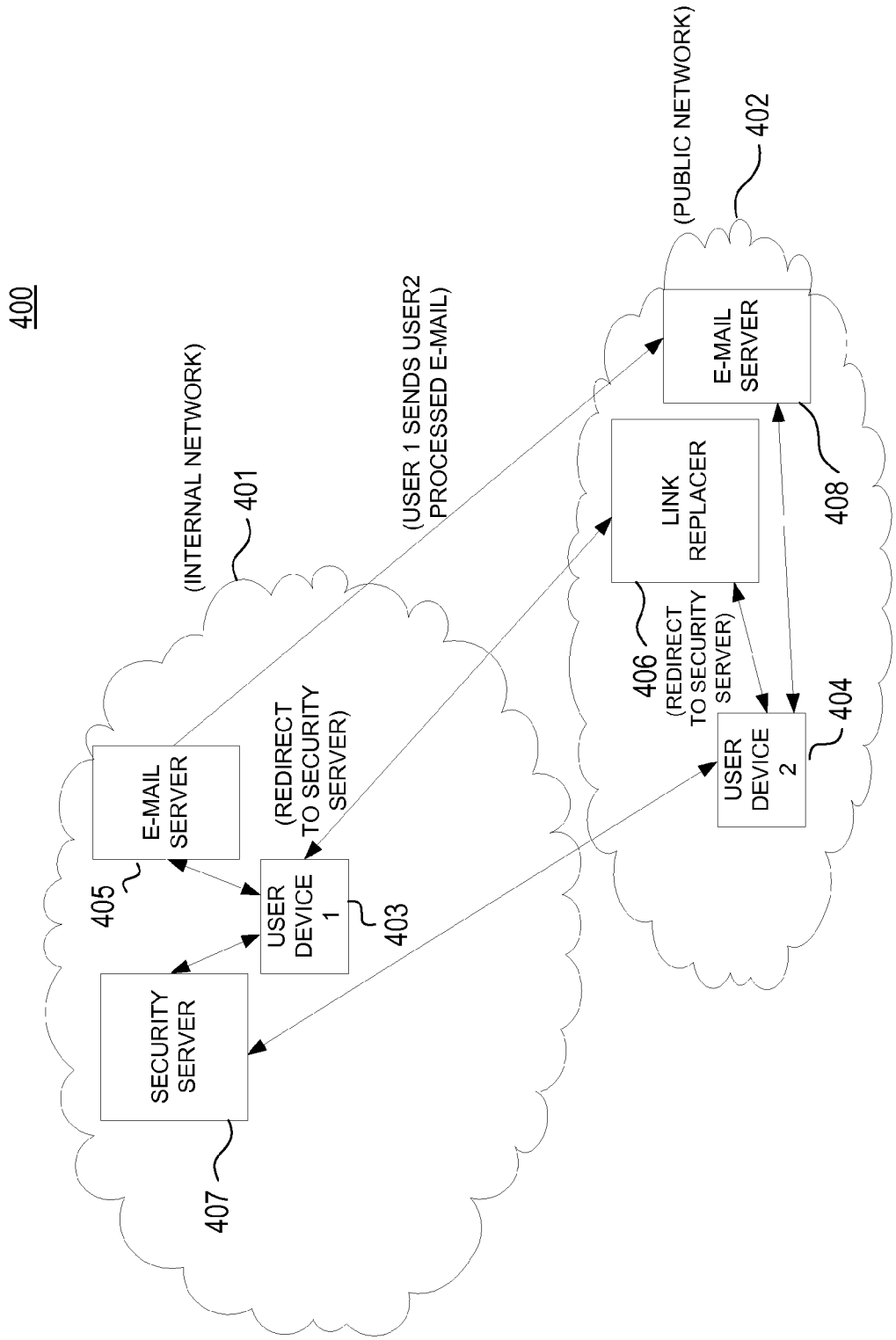
FIG. 4 shows another system that processes and handles web links embedded in electronic messages in accordance with an aspect of the embodiments.

FIG. 4 shows system 400 that processes and handles web links in electronic messages in accordance with an aspect of the embodiments. The scenario depicted in FIG. 4 is similar to the scenario depicted in FIG. 3, where networks 401 and 402, user devices 403 and 404, e-mail servers 405 and 408, and security server 407 correspond to networks 301 and 302, user devices 303 and 304, e-mails servers 305 and 308, and security server 307, respectively. However, link replacer 406 resides in public network 402 rather than in internal network 401. With some embodiments, link replacer 406 may reside in either internal network 401 or directly on the Internet 402. In order to have proper operation between security server 407 and user 404, a VPN or other VPN-like connection may be supported.

Because link replacer 406 runs on the Internet and is publicly accessible, system 400 provides security to user devices that are off a company's private network 401. For example, a user may have a company's laptop at home and disconnected from the company's virtual private network (VPN). In accordance with traditional systems, the user's device would not go through the company's proxy and may be consequently infected. However, with aspects of the embodiments, all e-mail traffic goes through link replacer 406. This approach may also extend to partners of the company, in which someone at the company forwards an e-mail but it is later found to contain a malware link.

FIG. 5 shows system 500 that processes and handles web links in electronic messages in accordance with an aspect of the embodiment. System 500 is similar to system 400 that is shown in FIG. 4; however, both security server 507 and link replacer 506 are configured within public network 502 rather than private network 501.

FIG. 6 shows flow chart 600 for processing an electronic message by e-mail server 205 (as shown in FIG. 2 but also may correspond to server 305 or 405 as shown in FIGS. 3 and 4, respectively) before a user can access it in accordance with an aspect of the embodiments. At step 601, process 600 replaces one or more the embedded web links in an electronic message with an alias web link. With some embodiments, all embedded web links in an electronic message are replaced to ensure central control of security even if the originally web link were deemed secure.

Before e-mail server 205 replaces the original web link in the electronic message, e-mail server 205 registers the alias web link with link replacer 206 so that the alias web link is properly mapped to the original web link.

Figure 8:
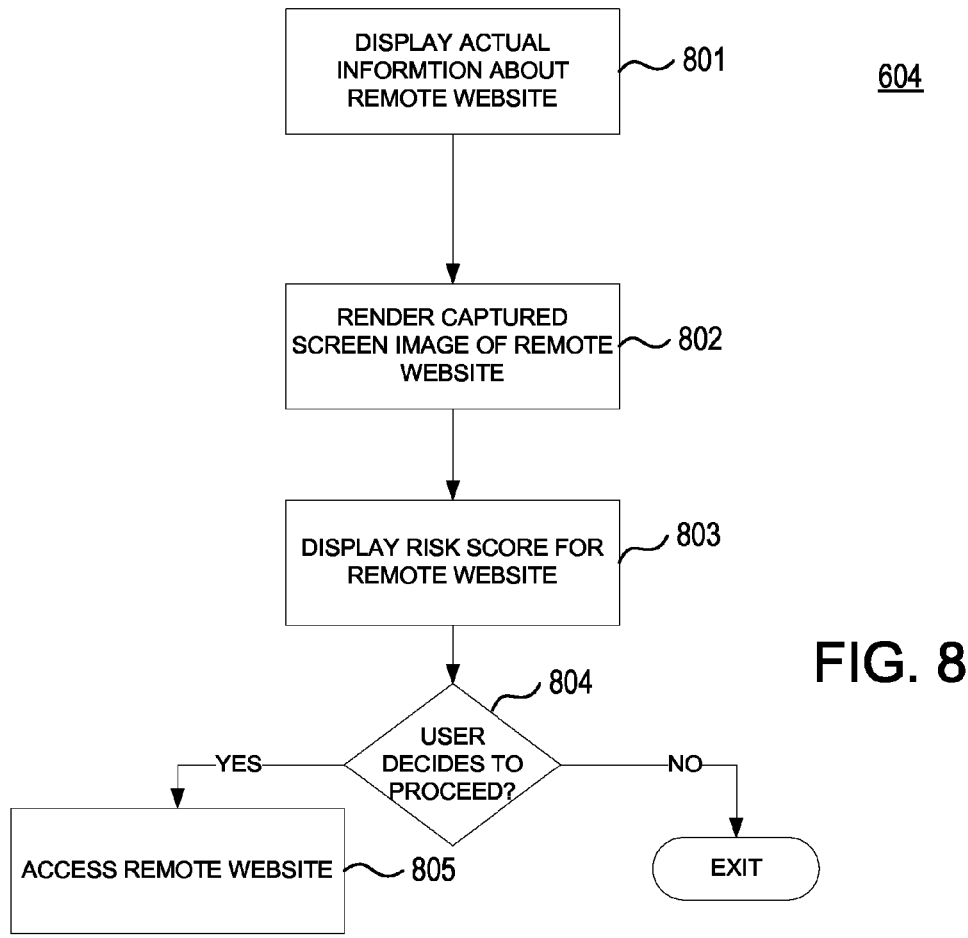
FIG. 8 shows a flow chart for generating an intermediate webpage in accordance with an aspect of the embodiments.

At block 602, process 600 determines a risk score for the original (actual) webpage. If the determined risk score is greater than a predetermined risk score (i.e., the remote webpage is potentially malicious) at block 603, an intermediate webpage is generated for the original webpage at block 604, where one intermediate webpage is created for each potentially malicious remote (original) webpage. (An illustrative screenshot for an intermediate webpage is shown in FIG. 11.) With some embodiments, link replacer 206 informs security server 207 that the original webpage may be malicious, and consequently security server 207 generates the intermediate webpage by executing a process such as process 800 as shown in FIG. 8.

Figure 7:
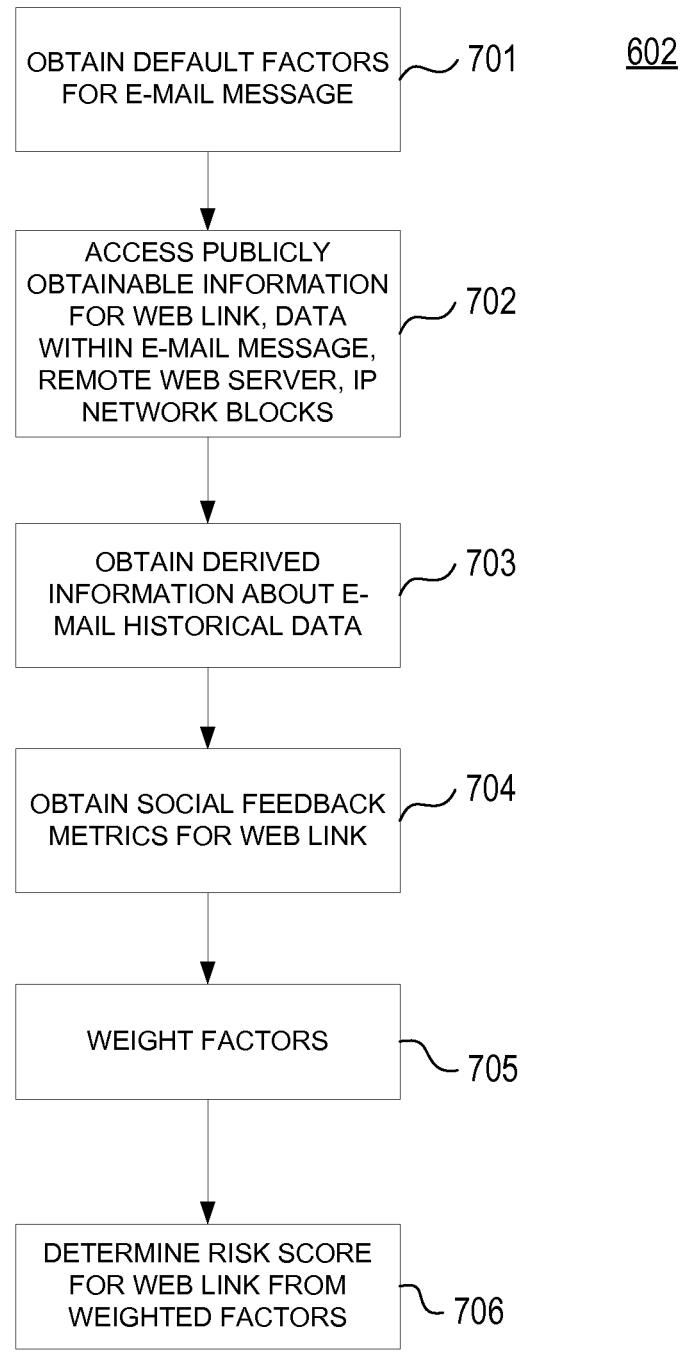
FIG. 7 shows a flow chart for determining a risk score for a webpage that is addressed by an embedded web link in an electronic message in accordance with an aspect of the embodiments.

FIG. 7 shows flow chart 602 (corresponding to block 602 in FIG. 6) for determining a risk score for a webpage that is addressed by an embedded web link in an electronic message in accordance with an aspect of the embodiments. Process may consider information from different sources and appropriately weight the different information to determine a risk score for a remote webpage.

A traditional system typically consider characteristics of a message (in terms of text and sender) when making a decision as to whether the message is SPAM, but the traditional system may not fully take into account the risk of the embedded web link itself. An embedded web link, when combined with additional risk data, may be leveraged to provide the user with additional details to enable a more informed decision about whether or not to visit the remote site. According to an aspect of the embodiments, the user is provided relevant information that may influence the user's decision to click to a potential malicious site and thus reduce the number of successful attacks.

Process 602 considers available data from different categories and combines them when creating a risk model for the embedded web links. As will be further discussed, data categories include available data by default, publicly-obtainable information, and derived information corresponding to blocks 701, 702, and 703, respectively. The data may encompass both information about the electronic message in which the web link is embedded as well as specific information about the embedded web link itself.

Referring to FIG. 7, at block 701 process 602 obtains default factors for an electronic message that may be available from Simple Mail Transfer Protocol (SMTP) mail headers and from the characteristics of the electronic message.

Available data from SMTP headers may include:
Complete Received-By information of all SMTP hosts the message passed through, including IP addresses and text identification of the remote servers;
Dates/times the message was sent and received;
From address and sender name;
To address, and the number of recipients on the To: line;
CC/BCC addresses, and the number of recipients;
Return path;
"X-" lines, sometimes including X-Mailer (email client), where "X-mailer" is a line in the header of an e-mail message that shows which software the sender used to send the message;
Whether the TLS/SSL protocol was used, and if so the certificate issuer and key size;
The presence of DomainKeys/DomainKeys Identified Mail (DKIM) signatures and key size;
Sender policy framework (SPF) record status; and
Whether or not the email originated or routed through a known e-mail service provider (ESP) or commercial mailer.

Also, the default category of data may be obtained from the characteristics of the electronic message, including:
Mail format (e.g., plain text, RTF, HTML);
Length of the message and text/contents;
Number of web links;
Link destinations; and
Unsubscription information or links to indicate commercial mailings.

At block 702, publicly-obtainable risk information about the embedded web link as well as risk information about data within the electronic message, remote web server, and IP network blocks.

Risk information for the actual web links URLs may include:
Validity of the URLs (are they valid domains and not gibberish);
Mismatches between an HTML anchor HREF and displayed value;
Use of network ports other than 80/443;
Use of uniform resource identifiers (URIs) instead of URLs;
List of all domains used in the message and links, both in the href and display; and
Ability to resolve the linked domains to valid IP addresses.

Also, publicly-obtainable risk information may be obtained for IP addresses associated with the message (Received-by SMTP hosts, any embedded links, and any new domains picked up by visiting the site, including IFRAMEs.)

This type of information may include:
  Public black hole lists;
  Private IP address watch lists/ban lists;
  Geolocation and country of the IP addresses;
  IP characteristics—DSL/home use, business; and
  Threat and reputation of the sender IP addresses, as correlated with other internal data sources.

In addition, publicly-obtainable risk information may be obtained from risk information for Internet domains associated with the electronic message. This may include:
  Validity of the domain (is it a valid domain at all); Internet registrar used, and a possible risk rating derived from the registrar since most SPAM comes from a few specific registrars;
  Length of time the domain has been registered;
  Public/private status of contact details for the domain;
  DNS servers used and the associated risk information if the servers use a different domain;
  Publicly defined mail servers (DNS MX records) of mail hosts, and related risk details around the servers and domains used;
  Velocity of changes to the domain records, as reported by historical record keeping services;
  Availability of and analysis of content of the primary website for the Internet domains;
  Other Internet sites hosted on the same servers/services;
  IP risk status of all detected IP addresses related to the message; and
  Reputation status and presence on services.

Also, publicly-obtainable risk information may be obtained from risk information about the remote web server. This may include:
  Web server software in use;
  Whether or not the remote websites are alive (for example, by sending an HTTP HEAD request to them);
  The presence of HTTP redirects when visiting/viewing the link, including the use of URL shortening services;
  The use of IFRAMEs on the remote site, and any risks associated with those linked domains; and
  Generated screenshots of the remote website, displaying the content of the webpage.

Also, publicly-obtainable risk information may be obtained from risk information related to the IP network blocks in question. This may include:
  Regional internet registry (RIR) ownership information on the network blocks, such as records from the American Registry for Internet Numbers (ARIN); and
  Use of Border Gateway Protocol (BGP) or public routing protocols in conjunction with the defined networks.

At block 703, derived information about e-mail historical data is obtained. The derived information may include:
  Characteristics of previous emails, such as TLS/SSL, received-by, and the like. This information may be used to compare the newly arrived message to other samples purporting to originate in the same domain and to track historical records for inbound and outbound e-mails. While this information may improve the risk score, some embodiments may choose not to include this information in the risk score determination in order to simplify operation;
  Whether or not the sender has ever sent email to this recipient in the past;
  Whether or not the recipient has ever sent email to the sender. This information may be used to determine if an existing relationship exists; and
  Whether or not the recipient has ever sent an attachment to the sender, which may indicate a stronger possible relationship.

At block 704, social feedback metrics are obtained about the embedded web link. For example, other users may have considered accessing the corresponding webpage via intermediate webpage 1100 (as will be discussed in FIG. 11) and have voted whether to access the website to report the website as being risky. For example, the user feedback may provide crowd-voting about the embedded web link based on a large group's opinions and judgment.

With some embodiments, the social feedback metrics may be used for marketing purposes. For example, a company may track the domains or web links replaced most often, how many users are clicking on the links and further track externally-delivered e-mails and how many users clicked through. For example, the company can rank order the amount of traffic with different partner websites to determine the greatest activity with a partner company.

The above information may be weighted based on a determined relative degree of important at block 705, so that a risk score may be determined for the embedded web link at block 706. Process 602 may then be repeated for other embedded web links in the electronic message.

FIG. 8 shows flow chart 800 for generating an intermediate webpage (e.g., immediate webpage 1100) in accordance with an aspect of the embodiments. As previously discussed, the intermediate webpage may be generated only when risk score (e.g., as determined by process 602 as shown in FIG. 7) of the original web page is above a predetermined threshold (e.g., at block 603 as shown in FIG. 6).

Process 800 displays actual information about the original webpage at block 801. For example, the actual domain of the remote site may be displayed even the sender attempts to conceal it.

At block 802, the captured screen image of the remote website is displayed without the user accessing the actual website. The user may conclude that the website is suspicious or that the content is not of interest to the user. If an electronic message contains a plurality of embedded web links, each web link may have a separate risk score. For example, one embedded web link may have a risk score above the predetermined threshold, while another web link may have a risk score below the predetermined threshold. However, with some embodiments, the risk scores of the embedded web links in an electronic message may be coupled together. For example, if one embedded web link has a risk score above a predetermined threshold, all of the other embedded web links may be deemed as being potentially malicious no matter what their risk scores are.

At block 783, the risk score for the actual web site is displayed, e.g., where the risk score is determined by process 602. With some embodiments, the risk score may be normalized from 0 to 100, where the higher the score, the greater the risk.

From the information provided at blocks 801-803, the user makes a decision whether to access the actual webpage at block 804. If so, process 800 accesses the website at block 805.

FIG. 9 shows flow chart 900 for processing an access request of an original webpage in accordance with an aspect of the embodiments. With an aspect of the embodiments, an original web link is replaced with a replaced web link (e.g., shortened URL) in conjunction with a risk rating system, an intermediate (speed bump) webpage, and a social feedback system where different users provide input to the risk model.

With an aspect of the embodiments, process 900 supports a risk model that takes into consideration various aspects of the information described previously to create a risk score for the remote URL based on how likely it is to be malicious. As previously discussed, some or all embedded web links may be replaced in an e-mail. When the user clicks on the replaced web link that is inserted into the e-mail, the user's web browser is not always taken to the original website. In the event that the risk score is high enough, the user is presented with an intermediate webpage, which typically provides details about the actual webpage to enable the user to make an informed choice as to whether or not to proceed to the website. Consequently, the user can spontaneously click on any embedded web link without worrying about the dire consequences of accessing a malicious website.

Because all of the clicks are routed through link replacer 206, IT administration also retroactively knows who clicked on a link. This may be useful in the case where a particular user clicks on a link because the user thinks that the remote site is valid, but IT administration later determines that it really was not a valid site. Because IT administration knows that the particular user clicked the web link, IT administration can investigate the user's computing device for signs of malware infection.

Referring to FIG. 9, the user accesses an electronic message at block 901 and clicks on an embedded replaced web link at 902. Also, interest metrics may be updated for marketing purposes. For example, the more often users click on a particular web link, the more interest users have, thus enhancing the marketing value of the webpage.

At block 903, the user's web browser is directed to a security server (e.g., server 207 as shown in FIG. 2) via a link replacer (e.g., server 206) so that a proper degree of security can be provided to the user.

If the original website is deemed sufficiently risky as determined at block 904, access to the website is denied so that the user is not even permitted to decide whether to access it. For example, the risk score may be greater than a first predetermined threshold. If access is not automatically denied, the risk score of the embedded website is compared with a second predetermined threshold at block 905. If less than the second predetermined threshold, the user is allowed to directly access the original website at block 906. Otherwise (i.e., the original webpage is a potential threat), the intermediate webpage (e.g., screenshot 1100 as shown in FIG. 11) for the embedded web link is presented to the user at block 907.

At block 908, the intermediate webpage enables the user to decide whether to access the original website based on information provided by the intermediate webpage. Social feedback metrics are updated based on the user's selection at blocks 909 and 910. If the user decides to access the original website, the webpage is accessed via the current web browser at block 911. However, with some embodiments a hardened virtual web browser may be launched to render the original website.

Risk of an electronic message may be associated with attachments as well as embedded web links. Consequently, flow chart 1000, as shown in FIG. 10, processes an attachment in an electronic message in accordance with an aspect of the embodiments. With some embodiments, attachments in electronic mail may be quarantined at block 1001 before a user is able to access the electronic mail. A risk score for the attachment may be determined from the characteristics of the electronic mail at block 1002. Notification (e.g., via a notification e-mail) may then be sent to the recipient of the e-mail informing the recipient about the quarantined attachment at block 1003, requiring the recipient to click on a web link that takes the recipient to an intermediate webpage. If the risk score is sufficiently high, e.g., above a threshold, the user may be denied access to the attachment at block 1004 if the attachment is likely to be malicious. However, if access is not denied, the user is presented an intermediate webpage at block 1005. For example, the intermediate webpage may provide information about the sender and/or attachment and a captured image of the attachment so that the recipient (user) can decide whether to access the attachment. With some embodiments, text may be extracted from the attachment so that keywords, themes, and actual words can be presented to the user so that the user is able to further investigate the attachment without opening the document on the user's computing device. When reviewing the intermediate webpage, the user selects whether or not to access the attachment. If so, the user is provided the attachment.

FIG. 11 shows exemplary screenshot 1100 in which an intermediate webpage is displayed in accordance with an aspect of the embodiments. When a user clicks on the a replaced web link in e-mail, which has replaced the original web link, the user's web browser is not directed to the original webpage if the corresponding risk score is above a predetermined threshold as previously discussed, e.g., with process 900 as shown in FIG. 9. In such a case, the user is presented with an intermediate (speed bump) webpage 1100. Intermediate webpage 1100 typically provides pertinent details to enable the user to make an informed choice as to whether or not to proceed to the original website. When the original webpage is potentially malicious and intermediate webpage 1100 is displayed, warning 1101 is shown.

Intermediate webpage 1100 may display information including:

The actual domain of the remote site (unmasked from the intruder's attempts to conceal it. Consequently, the user sees the actual URL rather the displayed URL that is shown in the original e-mail. (region 1103);

The country the site is hosted in. (region 1104);

How long the site has been online (region 1105). This information may include the length of time the Internet domain has been registered;

A JPEG image that represents a rendered screen capture of the original webpage that may provide a visual aid to show what the user would see if the user were to proceed. (region 1102);

The determined risk score (confidence score) whether the remote website is valid or risky. (region 1106); and Anything else that shows the user that can help the user make a better decision. (region 1107)

Intermediate webpage 1100 typically unmasks many of the tricks that entice the user to click on the web link. By viewing region 1103, the user recognizes that the site really is some other website than what is purported. Screenshot 1100 may also display an image of a website that looks like the purported website at region 1102. Such apparent deceit is indicative of a malicious website, and a user would tend to avoid accessing the original website.

Based on the information presented by immediate webpage 1100, the user decides whether or not to access the original website. If the remote site looks good and is what the user is looking for, the user selects button 1108. On the other hand, if the remote site looks bad and may be an attempt to deceive the user, the user selects button 1109.

Each time the user clicks one of buttons 1108 or 1109, the selection represents a vote for or against that site. Consequently, voting by a number of users in a company (sometimes in the many thousands) can leverage the collective wisdom to rate the unknown sites and quickly identify malicious domains and phishing attempts.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

We claim:

1. An apparatus comprising:
at least one memory device; and
at least one processor coupled to the at least one memory and configured to perform, based on instructions stored in the at least one memory:
receiving a request, from one of a plurality of users, to access a replaced web link that is contained in an electronic message, wherein the replaced web link replaces an original web link that addresses an original webpage;
determining a risk score for the original webpage from an indication about the original webpage and from a social feedback metric, wherein the social feedback metric is indicative of a user action and wherein the social feedback metric represents a collective opinion of the original webpage regarding risk by other users of the plurality of users;
when the risk score for the original webpage is greater than a first predetermined threshold, providing an intermediate webpage, wherein the intermediate webpage provides at least one webpage characteristic about the original webpage and displays a first selection option whether to access the original webpage and a second selection option not to access the original webpage;
when the first selection option is selected from the intermediate webpage, accessing the original webpage; and
updating a vote count about the social feedback metric for the original webpage based on the selected option.

2. The apparatus of claim 1, comprising:
a first computing device;
a second computing device that is configured to map the replaced web link to a data entry on the first computing device;
the first computing device configured to perform the providing the intermediate webpage and the accessing the original webpage.

3. The apparatus of claim 1, wherein the at least one processor is further configured to perform:
replacing the original web link with the replaced web link in the electronic message.

4. The apparatus of claim 1, wherein the at least one processor is further configured to perform:
repeating the replacing for all web links embedded in the electronic message.

5. The apparatus of claim 1, wherein the at least one processor is further configured to perform:
determining the risk score for the original webpage from header information in the electronic message.

6. The apparatus of claim 1, wherein the at least one processor is further configured to perform:
determining the risk score for the original webpage from a message characteristic of the electronic message.

7. The apparatus of claim 1, wherein the at least one processor is further configured to perform:
determining the risk score for the original webpage from publicly-obtainable information.

8. The apparatus of claim 1, wherein the at least one processor is further configured to perform:
determining the risk score from historical data for a recipient and a sender of the electronic message.

9. The apparatus of claim 1, wherein the at least one processor is further configured to perform:
updating the social feedback metric when the selection from the intermediate webpage is detected.

10. The apparatus of claim 1, wherein the at least one webpage characteristic about the original webpage includes a rendered screen capture of the original webpage.

11. The apparatus of claim 1, wherein the at least one webpage characteristic about the original webpage includes displayed information about the risk score of the original webpage.

12. The apparatus of claim 1, wherein the at least one processor is further configured to perform:
when the risk score for the original webpage is greater than a second predetermined threshold, denying access to the original webpage.

13. The apparatus of claim 1, wherein the at least one processor is further configured to perform:
tracking activity metrics about the original webpage when the original webpage is mapped to the replaced web link; and
determining a market characteristic about the original webpage.

14. The apparatus of claim 1, wherein the at least one processor is further configured to perform:
launching a hardened virtual web browser, wherein the hardened web browser is different from a previous web browser previously executing; and
accessing the original web page via the hardened web browser.

15. A computer-assisted method comprising:
replacing an original web link with a replaced web link in the electronic message to a recipient to a sender, wherein the original web link maps to an original webpage;
determining a risk score for the original webpage from risk indication about the original webpage and from a social feedback metric, wherein the social feedback metric represents a collective opinion of the original webpage regarding risk by a plurality of users;
receiving a request, from a first user of the plurality of users, to access the replaced web link that is contained in the electronic message;
when the risk score for the original webpage is greater than a predetermined threshold, providing a first intermediate webpage, wherein the first intermediate webpage provides at least one characteristic about the original webpage and displays a first selection option whether to access the original webpage and a second selection option not to access the original webpage;
when the first selection option is selected from the first intermediate webpage, accessing the original webpage; and
updating a vote count about the social feedback metric for the original webpage based on the selected option.

16. The method of claim 15, further comprising:
determining the risk score by further including message information contained in the electronic message.

17. The method of claim 15, further comprising:
receiving historical data about previous electronic messages from the sender to the recipient of the electronic message;
determining a degree of an existing relationship between the sender and the recipient; and determining the risk score by including the determined degree of the existing relationship.

18. The method of claim 15, wherein the electronic message contains a file attachment, the method further comprising:
   quarantining the file attachment;
   determining a risk level of the attachment;
   sending notification of the quarantined file attachment to the recipient;
   in response to a request to access the attachment, providing a second intermediate webpage that is indicative of the risk level; and
   in response to the providing, receiving an indication whether to access the quarantined file attachment.

19. A non-transitory computer-readable storage medium storing computer-executable instructions that, when executed, cause at least one processor to perform:
   replacing an original web link with a replaced web link in the electronic message, wherein the original web link maps to an original webpage;
   determining a risk score for the original webpage from a social feedback metric about the original webpage, wherein the social metric is based on at least one user action and wherein the social feedback metric represents a collective opinion of the original webpage regarding risk by a plurality of users;
   receiving a request, from one of the plurality of users, to access the replaced web link that is contained in the electronic message;
   when the risk score for the original webpage is greater than a predetermined threshold, providing an intermediate webpage, wherein the intermediate webpage provides at least one webpage characteristic about the original webpage and displays a first selection option whether to access the original webpage and a second selection option not to access the original webpage;
   when the first selection option is selected from the intermediate webpage, accessing the original webpage; and
   updating a vote count about the social feedback metric for the original webpage based on the selected option.

20. The computer-readable medium of claim 19, wherein the computer-executable instructions, when executed, cause the at least one processor to perform:
   further determining the risk score from header information in the electronic message, publically-obtainable information, and historical data for a recipient and a sender of the electronic message.

21. The computer-readable medium of claim 19, wherein the computer-executable instructions, when executed, cause the at least one processor to perform:
   generating, without accessing the original webpage by said one of the plurality of users, a rendered screen capture of the original webpage and an indication of the risk score in the intermediate webpage.

22. An apparatus comprising:
   a first memory device;
   a second memory device;
   a first computing device that is connected on a public communication network, the first computing device coupled to the first memory device to perform, based on instructions stored in the first memory device:
   receiving a request to access a replaced web link in an electronic mail message, the replaced web link replacing an original web link that addresses an original webpage; and
   redirecting the request to a second computing device, wherein the replaced web link maps to a web address assigned to a second computing device;
   the second computing device connected on a private communication network, the second computing device coupled to the second memory device and configured to perform, based on instructions stored in the second memory device:
   receiving, from one of a plurality of users, a request to access a replaced web link that is contained in an electronic mail message, wherein the replaced web link replaces an original web link that addresses an original webpage;
   determining a risk score for the original webpage from an indication about the original webpage and from a social feedback metric, wherein the social feedback metric is indicative of a user action and wherein the social feedback metric represents a collective opinion of the original webpage regarding risk by other users of the plurality of users;
   when the risk score for the original webpage is greater than a first predetermined threshold, denying access to the original webpage;
   when the risk score for the original webpage is greater than a second predetermined threshold and not greater than the first predetermined threshold, providing an intermediate webpage, wherein the intermediate webpage provides at least one webpage characteristic about the original webpage and displays a first selection option whether to access the original webpage and a second selection option not to access the original webpage;
   when the first selection option is selected from the intermediate webpage, accessing the original webpage; and
   updating a vote count about the social feedback metric for the original webpage based on the selected option.

* * * * *